(12) United States Patent  
Shibuya et al.

(10) Patent No.: US 7,977,416 B2
(45) Date of Patent: Jul. 12, 2011

(54) AROMATIC POLYCARBONATE RESIN COMPOSITION AND PRODUCTION METHOD THEREOF

(75) Inventors: Kazuhiro Shibuya, Yokohama (JP); Akira Miyamoto, Yokohama (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 487 days.

(21) Appl. No.: 12/149,953

(22) Filed: May 9, 2008

(65) Prior Publication Data

US 2008/0249215 A1    Oct. 9, 2008

Related U.S. Application Data

(62) Division of application No. 11/185,948, filed on Jul. 21, 2005, now Pat. No. 7,572,847.

(51) Int. Cl.
   *C08K 5/41* (2006.01)
(52) U.S. Cl. ......... 524/156; 524/449; 524/451; 524/611
(58) Field of Classification Search .................. 524/156, 524/449, 451, 611
   See application file for complete search history.

(56) References Cited

U.S. PATENT DOCUMENTS

| | | | | |
|---|---|---|---|---|
| 6,730,725 B2 * | 5/2004 | Masuki et al. | .................. | 524/94 |
| 7,060,780 B2 * | 6/2006 | Miyamoto et al. | ............ | 528/196 |
| 7,405,253 B2 * | 7/2008 | Kurasawa | ..................... | 524/456 |

FOREIGN PATENT DOCUMENTS

| JP | 2283760 | | 11/1990 |
|---|---|---|---|
| JP | 03-021664 | * | 1/1991 |
| JP | 3021664 | | 1/1991 |
| JP | 5222283 | | 8/1993 |
| JP | 5302025 | | 11/1993 |
| JP | 6207089 | | 7/1994 |
| JP | 6256632 | | 9/1994 |
| JP | 6287427 | | 10/1994 |
| JP | 9003313 | | 1/1997 |
| JP | 9157509 | | 6/1997 |
| JP | 9316316 | | 12/1997 |
| JP | 10-060248 | * | 3/1998 |
| JP | 10060248 | | 3/1998 |
| JP | 2000-186194 | * | 7/2000 |
| JP | 2000186194 | | 7/2000 |
| JP | 2000327900 | | 11/2000 |
| JP | 2001-019756 | * | 1/2001 |
| JP | 2001019756 | | 1/2001 |

OTHER PUBLICATIONS

U.S. Appl. No. 11/185,948, filed Jul. 21, 2005, Kazuhiro Shibuya et al, Asahi Kasei Corporation.
Office Action, mailed Mar. 17, 2008, in U.S. Appl. No. 11/185,948.
Office Action, mailed Jun. 13, 2008, in U.S. Appl. No. 11/185,948+.
Interview Summary, mailed Aug. 5, 2008, in U.S. Appl. No. 11/185,948.
Office Action, mailed Nov. 5, 2008, in U.S. Appl. No. 11/185,948.
Interview Summary, mailed Feb. 10, 2009, in U.S. Appl. No. 11/185,945.
Notice of Allowance, mailed Apr. 8, 2009, in U.S. Appl. No. 11/185,948.

* cited by examiner

*Primary Examiner* — Peter D. Mulcahy
*Assistant Examiner* — Henry Hu
(74) *Attorney, Agent, or Firm* — Staas & Halsey LLP

(57) ABSTRACT

According to the present invention, an aromatic polycarbonate resin composition comprising: a resin component (A) mainly comprising an aromatic polycarbonate; a reinforcing agent and/or a filler (B); and an aromatic sulfonic acid and/or an ester thereof (C), wherein a mixture consisting of said component (B) and said component (C) has a pH of 4 to 8 when measured in accordance with JIS-K5101, and said composition comprises 1 to 200 parts by weight of said component (B) and 0.001 to 5 parts by weight of said component (C) based on 100 parts by weight of said component (A) is provided.

8 Claims, No Drawings

AROMATIC POLYCARBONATE RESIN COMPOSITION AND PRODUCTION METHOD THEREOF

CROSS-REFERENCE TO RELATED APPLICATIONS

This application is a divisional of application Ser. No. 11/185,948 filed Jul. 21, 2005 now U.S. Pat. No. 7,572,847, the entire contents of which are incorporated herein by reference.

BACKGROUND OF THE INVENTION

1. Technical Field

The present invention relates to an aromatic polycarbonate resin composition comprising: a reinforcing agent and/or a filler excellent in melt stability and appearance, and a production method thereof. More specifically, the present invention relates to an aromatic polycarbonate resin composition comprising: a reinforcing agent and/or a filler with improved thermal-hydrolysis resistance, dispersibility of reinforcing agent and/or filler and flame retardancy in addition to the above-described properties, and a production method thereof.

2. Prior Art

An aromatic polycarbonate is a resin material having excellent mechanical properties such as impact resistance and excellent heat resistance; thus, an aromatic polycarbonate is widely utilized as a housing material for various products such as computers, notebook-type personal computers, printers, word processors, copying machines, and the inner part material of electronic/electric equipment or a material for vehicle. To enhance rigidity, to prevent deformation caused by external stress, or to furnish dimensional accuracy to an aromatic polycarbonate, a method of formulating a reinforcing agent and/or a filler such as glass fiber, glass flake, carbon fiber or talc to a polycarbonate is often employed.

Such a method of formulating a reinforcing agent and/or a filler to an aromatic polycarbonate resin is disclosed in, for example, JP-A-5-302025, JP-A-5-222283, JP-A-6-256632, JP-A-6-207089, JP-A-6-287427, JP-A-9-3313, JP-A-9-157509, JP-A-9-316316, JP-A-2000-186194, JP-A-2000-327900 and JP-A-2001-19756.

However, an aromatic polycarbonate resin composition, comprising: a reinforcing agent and/or a filler, has a problem that decomposition of a base resin, an aromatic polycarbonate, is promoted due to the reinforcing agent and/or filler during molding processing. In particular, when a basic inorganic compound type filler such as talc and mica is used, the melt stability of an aromatic polycarbonate decreases significantly during melt kneading or molding processing, which results in a problem of significant deterioration of physical properties of the material. Furthermore, an aromatic polycarbonate resin composition comprising a reinforcing agent and/or a filler has a disadvantage of bringing about troubles such as silver streaks during injection molding to obtain a molded article, which impairs the surface appearance of the molded article.

Methods of improving melt stability of an aromatic polycarbonate resin composition comprising a reinforcing agent and/or a filler have been so far proposed as follows. That is, there has been: a method for combined use of an organic acid disclosed in JP-A-3-21664; a method for combined use of a phosphorous compound disclosed in JP-A-2-283760; and a method for combined use of a phosphonium sulfonate compound disclosed in JP-A-10-60248. A certain degree of improvement of the melt stability can be attained by these methods, however, the melt stability at high temperatures and/or for a longer period is insufficient, and the aromatic polycarbonate resin obtained by above methods still has a problem of insufficient melt stability in the case of molding at high processing temperatures. It is often necessary to elevate a melt resin temperature in order to decrease melt viscosity in a case where a molded article with a thin wall thickness is desired. Furthermore, the above prior technologies still have a problem of silver streaks generation, which impairs the surface appearance of the molded article.

SUMMARY OF THE INVENTION

It is an object of the present invention to provide an aromatic polycarbonate resin composition comprising a reinforcing agent and/or filler excellent in melt stability and appearance and a production method thereof. More specifically, the present invention relates to an aromatic polycarbonate resin composition comprising: a reinforcing agent and/or a filler with improved thermal-hydrolysis resistance, improved dispersibility of reinforcing agent and/or filler and improved flame retardancy. In addition to the above-described properties, the present invention relates to a production method thereof.

The present inventors have extensively studied means for solving the above-described problems and found unexpectedly that by formulating an aromatic sulfonic acid and/or an ester thereof, in the specified amount range, to produce an aromatic polycarbonate resin composition comprising a reinforcing agent and/or a filler, the melt stability of the resin composition can be dramatically enhanced, and a molded article with excellent appearance can be obtained. Furthermore, an aromatic polycarbonate resin composition comprising a reinforcing agent and/or a filler with improved thermal-hydrolysis resistance, improved dispersibility of reinforcing agent and/or filler and improved flame retardancy can be obtained.

That is, the present invention provides an aromatic polycarbonate resin composition comprising: a resin component (A) mainly comprising an aromatic polycarbonate; a reinforcing agent and/or a filler (B); and an aromatic sulfonic acid and/or an ester thereof (C), wherein a mixture consisting of said component (B) and said component (C) has a pH of 4 to 8 when measured in accordance with JIS-K5101, and said composition comprises 1 to 200 parts by weight of said component (B) and 0.001 to 5 parts by weight of said component (C) based on 100 parts by weight of said component (A).

Further, the present invention provides a method of producing an aromatic polycarbonate resin composition comprising a resin component (A) mainly comprising an aromatic polycarbonate; a reinforcing agent and/or a filler (B); and an aromatic sulfonic acid and/or an ester thereof (C) by using a melt kneading apparatus, wherein said composition comprises 1 to 200 parts by weight of said component (B) and 0.001 to 5 parts by weight of said component (C) based on 100 parts by weight of said component (A), said method comprising the steps:

preparing a mixture consisting of said component (B) and said component (C) in advance, wherein said mixture of said component (B) and said component (C) has a pH of 4 to 8 when measured in accordance with JIS-K5101; and then feeding said component (A) and said mixture consisting of said component (B) and said component (C) to said melt kneading apparatus to melt knead them.

An aromatic polycarbonate resin composition of the present invention has not only improved rigidity, dimensional stability and solvent resistance but also excellent melt stability and appearance due to the effect of a reinforcing agent and/or a filler. Furthermore, in addition to these properties, the composition also has surprisingly remarkable features such as improved thermal-hydrolysis resistance, dispersibility of reinforcing agent and/or filler and flame retardancy. Thus, the composition is very useful industrially.

MOST PREFERRED EMBODIMENTS TO CARRY OUT THE INVENTION

The present invention is now explained in more detail.

First, explanations are given below with respect to component (A).

In the present invention, component (A) is a resin component mainly comprising an aromatic polycarbonate.

In the present invention, the "resin component mainly comprising an aromatic polycarbonate" means a resin containing more than 50 parts by weight, relative to 100 parts by weight of the resin component, of an aromatic polycarbonate. Component (A) may contain only an aromatic polycarbonate, or may further contain a thermoplastic resin other than an aromatic polycarbonate.

An aromatic polycarbonate used preferably as a component (A) of the present invention is an aromatic polycarbonate as derived from an aromatic dihydroxy compound. An aromatic dihydroxy compound includes, for example: bis(hydroxyaryl)alkanes such as 1,1-bis(4-hydroxy-t-butylphenyl)propane and 2,2-bis(4-hydroxyphenyl)propane; bis(hydroxyaryl)cycloalkanes such as 1,1-bis(4-hydroxyphenyl)cyclopentane and 1,1-bis(4-hydroxyphenyl)cyclohexane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dihydroxy-3,3'-dimethyldiphenyl sulfone. Among these, 2,2-bis(4-hydroxyphenyl)propane (generally called bisphenol A) is particularly preferable. These aromatic dihydroxy compounds may be used alone or in combination of two or more.

The aromatic polycarbonate preferably used as a component (A) of the present invention can be produced by known methods of production. Typically, the following aromatic polycarbonate production methods can be used: a known method for reaction of an aromatic dihydroxy compound with a carbonate precursor, for example, an interfacial polymerization method for reaction of an aromatic dihydroxy compound with a carbonate precursor (for example, phosgene) in the presence of an aqueous solution of sodium hydroxide and a methylene chloride solvent (for example, a phosgene method); an ester exchange method (a melt method) for reaction of an aromatic dihydroxy compound with a carbonate diester (for example, diphenyl carbonate); and a method for solid phase polymerization of a crystallized carbonate prepolymer obtained by a phosgene method or a melt method (JP-A-1-158033 (corresponding to U.S. Pat. No. 4,948,871), JP-A-1-271426 and JP-A-3-68627 (corresponding to U.S. Pat. No. 5,204,377).

A particularly preferable aromatic polycarbonate used as a component (A) of the present invention is an aromatic polycarbonate produced by an ester exchange method from a divalent phenol (an aromatic dihydroxy compound) and a carbonate diester that does not substantially contain chlorine atoms. The weight average molecular weight (Mw) of said aromatic polycarbonate is usually 5,000 to 500,000, preferably 10,000 to 100,000, more preferably 13,000 to 50,000, particularly preferably 15,000 to 30,000, and further particularly preferably 17,000 to 25,000.

In the present invention, the weight average molecular weight (Mw) of the aromatic polycarbonate can be measured by gel permeation chromatography (GPC) as follows. A calibration curve is obtained with respect to standard monodisperse polystyrene samples using a polystyrene gel column and tetrahydrofuran as a solvent. The obtained calibration curve is modified by a calculation using the following formula:

$$M_{PC}=0.3591\ M_{PS}^{1.0388}$$

(wherein $M_{PC}$ represents the molecular weight of an aromatic polycarbonate and $M_{PS}$ represents the molecular weight of polystyrene, thereby obtaining a modified calibration curve for a polycarbonate. The weight average molecular weight of a polycarbonate is measured by GPC using the obtained calibration curve.)

As an aromatic polycarbonate used as a component (A) of the present invention, it is also preferred to use in combination of two or more kinds of aromatic polycarbonates with different weight average molecular weight. For example, an aromatic polycarbonate for an optical disk material having Mw in the range of usually 14,000 to 16,000 and an aromatic polycarbonate for injection molding or extrusion molding having Mw in the range of usually 20,000 to 50,000 may be used in combination.

In the above-described resin mainly composed of an aromatic polycarbonate, preferable examples of a thermoplastic resin other than an aromatic polycarbonate include: polystyrene, acrylonitrile-styrene resin (AS resin), butyl acrylate-acrylonitrile-styrene resin (BAAS resin), acrylonitrile-butadiene-styrene resin (ABS resin), methyl methacrylate-butadiene-styrene resin (MBS resin), butyl acrylate-acrylonitrile-styrene resin (AAS resin), polyethylene terephthalate, polytrimethylene terephthalate, polybutylene terephthalate, polyamide, polymethyl methacrylate and polyarylate. In particular, an AS resin and a BAAS resin are preferable to enhance fluidity and an ABS resin and a MBS resin are preferable to enhance impact resistance. The amount of a thermoplastic resin other than an aromatic polycarbonate in the present invention is preferably 0.1 to 30 parts by weight, more preferably 0.5 to 20 parts by weight and further preferably 1 to 15 parts by weight based on 100 parts by weight of a component (A) in total.

A component (B) used in the present invention is a reinforcing agent and/or a filler usually used to enhance rigidity, enhance strength (reinforcing agent) or improve dimensional accuracy (filler) of a composition. Reinforcing agents and/or fillers with various shapes, such as fiber-like, plate-like and sphere-like shape, are used.

A fiber-like component (B) includes: glass fiber, carbon fiber, metal fiber, aluminum borate whisker, calcium titanate whisker, rock wool, silicon nitride whisker, boron fiber, tetrapod-like zinc oxide whisker and wollastonite. The fiber diameter is preferably 10 µm or less, more preferably 5 µm or less and further preferably 1 µm or less.

A plate-like component (B) includes: talc, mica, glass flake, and the like. The average particle diameter is preferably 50 µm or less, more preferably 20 µm or less and further preferably 10 µm or less.

A sphere-like component (B) includes: calcium carbonate, glass beads, glass balloon, carbon black, glass powder, silica, and the like. The average particle diameter is preferably 50 µm or less, more preferably 20 µm or less and further preferably 10 μm or less. For component (B), glass fiber, glass flake, carbon fiber, talc and mica are preferable. Talc and mica are particularly preferable.

A component (B) used in the present invention may be used after surface modification to enhance a compatibility with an aromatic polycarbonate matrix. The surface modification can be performed, for example, by a method in which a lipophilic organic compound is adsorbed onto the surface of component (B), or by a method in which component (B) is treated with a silane coupling agent or a titanate coupling agent.

The amount of a component (B) in the present invention, based on 100 parts by weight of a component (A), is in the range of 1 to 200 parts by weight, preferably 1 to 100 parts by weight, more preferably 2 to 50 parts by weight, further preferably 3 to 30 parts by weight, particularly preferably 4 to 20 parts by weight and most preferably 5 to 15 parts by weight.

A component (C) used in the present invention is an aromatic sulfonic acid and/or an ester thereof. Combined use of a component (B) with a component (C) in the present invention can suppress promotion of a decomposition of a component (A) caused by a component (B) and thus enhance melt stability of a resin composition dramatically. Furthermore, a component (C) does not easily volatilize even at temperatures of a resin processing. This effect is due to the interaction between a (A) component and a component (B); thus, the generation of volatile components can be suppressed to an extremely low level. Therefore, a resin composition of the present invention can be molded within a wide temperature range, and silver streaks and foaming can be effectively suppressed. This results in a molded article with very excellent surface appearance.

Specific examples of an aromatic sulfonic acid preferably used in the present invention include: aromatic sulfonic acids such as benzenesulfonic acid, p-toluenesulfonic acid, xylenesulfonic acid, naphthalenesulfonic acid, diisopropylnaphthalenesulfonic acid, diisobutylnaphthalenesulfonic acid and dodecylbenzenesulfonic acid; and polymer or oligomer-like aromatic sulfonic acids such as sulfonated polystyrene and methyl acrylaye-sulfonated styrene copolymer.

Specific examples of an aromatic sulfonate ester preferably used in the present invention include: methyl benzenesulfonate, ethyl benzenesulfonate, propyl benzenesulfonate, butyl benzenesulfonate, octyl benzenesulfonate, phenyl benzenesulfonate, methyl p-toluenesulfonate, ethyl p-toluenesulfonate, propyl p-toluenesulfonate, butyl p-toluenesulfonate, octyl p-toluenesulfonate, phenyl p-toluenesulfonate, methyl naphthalenesulfonate, ethyl naphthalenesulfonate, propyl naphthalenesulfonate, butyl naphthalenesulfonate, 2-phenyl-2-propyl dodecylbenzenesulfonate and 2-phenyl-2-butyl dodecylbenzenesulfonate.

As a component (C) of the present invention, a low molecular weight compound, an oligomer-like compound or a polymer-like compound can be used. In the present invention, a component (C) may be used in combination of two or more kinds.

In the present invention, the amount of a component (C) relative to a component (B) is also very important. Both an insufficient amount and an excess amount of a component (C) relative to a component (B) do not easily provide a resin composition excellent in melt stability or a molded article with excellent surface appearance. Among the above-described components (C), benzenesulfonic acid, p-toluenesulfonic acid, naphthalenesulfonic acid, and the like are most preferable examples.

The amount of a component (C) in the present invention is in the range of 0.001 to 5 parts by weight, more preferably 0.005 to 3 parts by weight, further preferably 0.01 to 1 part by weight and particularly preferably 0.05 to 0.5 parts by weight based on 100 parts by weight of a component (A). The amount of a component (C) less than 0.001 part by weight provides an insufficient improvement of melt stability. On the other hand, an amount of a component (C) exceeding 5 parts by weight tends to lower melt stability of a resin composition.

The amount, is measured in parts by weight, of a component (C) in a composition of the present invention is preferably as to provide: a pH value of a mixture consisting of said component (B) and said component (C), measured in accordance with JIS-K5101, in the range of 4 to 8, more preferably in the range of 4.2 to 7.8, further preferably in the range of 4.5 to 7.6, particularly preferably in the range of 5.0 to 7.4 and most particularly in the range of 5.5 to 7.2.

That is, the suitable amount of a component (C) in the present invention varies depending on the kind of a component (B), the shape of a component (B), the amount of a component (B) or the kind of a component (C). There are two operation methods for measuring pH value in accordance with JIS-K5105: a boiling method and a room temperature method. However, a boiling method is adopted in the present invention.

As for measurement of pH value of a mixture of a component (B) and a component (C) in the present invention, when solubility of a component (C) to water is low, alcohols such as ethanol and isopropyl alcohol are used as a dispersion medium of a suspension.

It is considered that, in a resin composition of the present invention, a component (C) is maintained stable at the surface and/or inside of a component (B) even at melt temperature region of a resin due to an interaction between a component (B) and a component (C). This results in development of excellent melt stability.

The actual situation that a component (C) is maintained stable at the surface and/or inside of a component (B) can be evaluated by thermogravimetric analysis (TGA) of mixture powders of the component (B) and the component (C) under nitrogen gas flow and programming rate of 40° C./minute by using a thermobalance. That is, the ratio of $\Delta W/W1$ (wherein $\Delta W=W1-W2$) is preferably not greater than 0.01, more preferably not greater than 0.008 and further preferably not greater than 0.005, provided that W1 (unit: % by weight) is a weight ratio of said mixture at 150° C. and W2 (unit: % by weight) is a weight ratio of said mixture at 300° C. each based on a weight of said mixture at room temperature (23° C.), because a component (C) is maintained stable at the surface and/or inside of a component (B). In the present invention, because a component (C) is maintained stable at the surface and/or inside of a component (B) at temperature around 300° C. or over that temperature, a high melt stability can be maintained even at processing temperature of a polycarbonate resin composition.

A preferable embodiment to produce a composition of the present invention is a method comprising preparing a mixture of a component (B) and a component (C) in advance, followed by feeding said mixture to a melt kneading apparatus such as an extruder separately from a resin raw material to carry out a continuous melt kneading.

In a resin composition of the present invention, when titanium oxide (D) is further formulated, yellowing resistance at mold processing, light resistance, thermal coloration resistance, and the like of the resin composition can be improved. That is, properties such as whiteness, light shielding property and light reflectance of the resin composition can be maintained for a long period according to the present invention.

A component (D) used in the present invention may be titanium oxide. A preferable titanium oxide as a component (D) in the present invention can be produced by a sulfuric acid method or a chlorine method; however, one produced by a chlorine method is preferable in view of the whiteness property. Further, the crystal morphologies of titanium oxide are rutile type and anatase type. However, in view of the properties of whiteness, light reflectance and light resistance, the crystal morphology of rutile type is preferable.

The average particle diameter of titanium oxide, a component (D) in the present invention, is selected from the range of 0.05 to 0.50 µm. The average particle diameter below 0.05 µm or over 0.50 µm tends to lower the light shielding property and the light reflectance property of a molded article. In the present invention, the average particle diameter of a component (D) is preferably 0.10 µm to 0.40 µm, more preferably 0.13 µm to 0.38 µm and particularly preferably 0.15 µm to 0.35 µm.

To enhance the melt stability of a resin composition during melt-kneading of the composition at high temperatures, titanium oxide, as a component (D) in the present invention, is preferably one surface-treated with at least one inorganic surface modifier selected from alumina hydrate and silicic acid hydrate. In this case, a blending ratio of alumina hydrate and silicic acid hydrate may be adopted in a wide range, usually 10 to 100 parts by weight of silicic acid hydrate based on 100 parts by weight of alumina hydrate. The amount of a mixture of alumina hydrate and silicic acid hydrate used for the treatment is preferably in the range of 1 to 15% by weight in the treated titanium oxide in view of reflectance and melt stability of a resin. In addition to alumina hydrate and silica acid hydrate, a surface modifier may contain a stabilizer, a dispersion modifier, and the like in an amount not to impair the object of the present invention.

As a component (D) in the present invention, titanium oxide, whose surface is treated with a silicone compound, is particularly preferable. Examples of said silicone compound include: organopolysiloxanes such as alkylpolysiloxanes, alkylarylpolysiloxanes and alkylhydrogenpolysiloxanes; and organopolysilicones such as alkylalkoxysilanes and amino silane coupling agents.

Preferable examples of the above-described silicone compounds include: methylhydrogenpolysiloxanes, methyltrimethoxysilane, trimethylmethoxysilane, N-β(aminoethyl)-γ-aminopropyltrimethoxysilane and N-β(aminoethyl)-γ-aminopropylmethyldimethoxysilane. A particularly preferable silicone compound is alkylhydrogenpolysiloxane. These silicone compounds may contain a stabilizer, a dispersion agent, and the like in an amount not to impair the object of the present invention.

As a method for surface treatment of titanium oxide with a silicone compound as to the above component (D), various methods can be adopted including: a wet type treatment method comprising dispersing titanium oxide and a surface treatment agent (a silicone compound) in water or an organic solvent; a dry type treatment method using a super mixer, Henschel mixer, and the like; a method comprising blending a surface treatment agent, titanium oxide, and an aromatic polycarbonate resin simultaneously in a V-type blender; and a method comprising charging them simultaneously into an extruder for extrusion; and the like.

In carrying out the above surface treatment, it is effective to use a solution of a silicone compound dissolved in a suitable solvent in order to attain more uniform coating of the silicone compound on the surface of titanium oxide. Examples of such a solvent include: methylpolysiloxanes with a relatively low molecular weight, decamethylcyclopentasiloxane, octamethylcyclotetrasiloxane, n-hexane, isopropyl alcohol, methylene chloride and 1,1,1-trichloroethane or a mixture thereof.

In any one of the above-described surface treatment methods, it is necessary that the heat treatment is carried out at high temperatures of 150 to 300° C., preferably 200 to 280° C., for about 2 to 15 hours. This heat treatment deactivates active sites of titanium oxide sufficiently for coating the surface of titanium oxide by subjecting the active sites present at the surface of titanium oxide to a reaction with the silicone compound or by crosslinking the silicone compound itself. Furthermore, it is necessary to carry out surface treatment stably by removing lower molecular weight components from the silicone compound.

The amount of the silicone compound used for surface treatment of titanium oxide, based on 100 parts by weight of titanium oxide, is preferably 0.01 to 30 parts by weight, more preferably 0.1 to 20 parts by weight and particularly preferably 1 to 10 parts by weight.

When a component (D) is used in the present invention, the amount, based on 100 parts by weight of a component (A), is usually 0.1 to 30 parts by weight, preferably 1 to 25 parts by weight, more preferably 2 to 20 parts by weight, further preferably 3 to 15 parts by weight and particularly preferably 4 to 12 parts by weight.

A component (E) used in the present invention is a fluoropolymer and can be used preferably. In the present invention, when a component (E) is formulated into a resin composition, melt characteristics of the resin composition can be improved and thus extrusion moldability or blow moldability thereof can be improved. Such a component (E) is a fluoropolymer having a fibril formation ability. As a component (E) in the present invention, a tetrafluoroethylene polymer, such as polytetrafluoroethylene, or a copolymer of tetrafluoroethylene and propylene is preferably used, and polytetrafluoroethylene is particularly preferable.

As a component (E), a fluoropolymer in various forms can be used such as a fine powder type fluoropolymer, an aqueous dispersion of a fluoropolymer and a powder mixture with a second resin such as AS or PMMA.

Examples of an aqueous dispersion of a fluoropolymer that are preferably used in the present invention include: "Teflon 30J (trade mark)" of Dupont-Mitsui Fluorochemicals Company Limited, "Polyflon D-1 (trade mark)", "Polyflon D-2 (trade mark)", "Polyflon D-2C (trade mark)" and "Polyflon D-2CE (trade mark)" of Daikin Industries, Ltd.

As a component (E) in the present invention, a powder mixture of a fluoropolymer with the second resin such as AS or PMMA can also be used suitably. Technology on a fluoropolymer as a mixture with these second resins is disclosed in, for example: JP-A-9-95583 (corresponding to U.S. Pat. No. 5,804,654), JP-A-11-49912 (corresponding to U.S. Pat. No. 6,040,370), JP-A-2000-143966 and JP-A-2000-297189. Examples of a fluoropolymer as a mixture with these second resins include: "Blendex 449 (trademark)" of GE Specialty Chemicals, Inc. and "Metablen A-3800 (tradwmark)" of Mitsubishi Rayon Co., Ltd.

In particular, when an aqueous dispersion of a fluoropolymer is used as a component (E) in the present invention, good dispersion of a component (B) in a resin composition can be attained and thus is preferable.

The amount of a component (E), based on 100 parts by weight of a component (A), used in the present invention is preferably 0.01 to 1 part by weight, more preferably 0.05 to 0.8 part by weight, further preferably 0.1 to 0.6 part by weight and particularly preferably 0.1 to 0.4 part by weight.

In an aromatic polycarbonate resin composition of the present invention, a coloring agent (excluding titanium oxide), a lubricant, a mold releasing agent, a flame retardant, a heat stabilizer, an antioxidant, an UV absorber, an epoxy compound, an antistatic agent, and the like can further be added, if necessary.

Examples of a flame retardant preferably used in the present invention include: an alkali metal salt of an aromatic sulfonic acid and an alkali metal salt of a perfluoroalkane sulfonic acid, the amount of these flame retardants, based on 100 parts by weight of a component (A), is 0.001 to 1 part by weight, preferably 0.005 to 0.8 part by weight, more preferably 0.01 to 0.7 part by weight, further preferably 0.03 to 0.5 part by weight, particularly preferably 0.05 to 0.3 part by weight and most preferably 0.06 to 0.2 part by weight.

It is preferable to formulate an organophosphorous stabilizer as a stabilizer into a resin composition. By formulating the organophosphorous stabilizer, heat stability, along with color tone stability, thermal-hydrolysis resistance, thermal coloration resistance and molding processability of a resin composition can be enhanced. As such an organophosphorous stabilizer, a phosphate ester, a phosphite ester and a phosphonate ester can be used as the organophosphorous stabilizer.

Specific examples of the phosphate ester include: tributyl phosphate, triethyl phosphate, trimethyl phosphate, triphenyl phosphate, diphenyl monooxoxenyl phosphate, dibutyl phosphate, dioctyl phosphate and diisopropyl phosphate.

Specific examples of the phosphite ester include: triphenyl phosphite, tris(nonylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, tris(2,4-di-tert-butylphenyl) phosphite, bis(2,6-di-tert-butyl-4-methylphenyl) pentaerythritol diphosphite, 2,2-methylenebis(4,6-di-tert-butylphenyl) octyl phosphite, bis(nonylphenyl)pentaerythritol diphosphite, bis(2,4-di-tert-butylphenyl) pentaerythritol diphosphite and distearylpentaerythritol diphosphite.

Specific examples of the phosphonate ester include: tetrakis(2,4-diisopropylphenyl)-4,4'-biphenylene diphosphonate, tetrakis(2,4-di-n-butylphenyl)-4,4'-biphenylene diphosphonate, tetrakis(2,4-di-tert-butylphenyl)-4,4'-biphenylene diphosphonate, tetrakis(2,4-di-tert-butylphenyl)-4,3'-biphenylene diphosphonate, tetrakis(2,4-di-tert-butylphenyl)-3,3'-biphenylene diphosphonate, tetrakis(2,6-diisopropylphenyl)-4,4'-biphenylene diphosphonate, tetrakis(2,6-di-n-butylphenyl)-4,4'-biphenylene diphosphonate, tetrakis(2,6-di-tert-butylphenyl)-4,4'-biphenylene diphosphonate, tetrakis(2,6-di-tert-butylphenyl)-4,3'-biphenylene diphosphonate, tetrakis(2,6-di-tert-butylphenyl)-3,3'-biphenylene diphosphonate, bis(2,4-di-tert-butylphenyl)biphenyl phosphonate, dimethyl benzenephosphonate, diethyl benzenephosphonate and dipropyl benzenephosphonate.

Among the above examples, those used particularly preferably are tris(2,4-di-tert-butylphenyl) phosphite, tetrakis(2,4-di-tert-butylphenyl)-4,4'-biphenylene diphosphonate and bis(2,4-di-tert-butylphenyl)biphenyl phosphonate.

The preferable amount of an organophosphorous stabilizer, based on 100 parts by weight of a component (A), is usually 0.001 to 0.5 part by weight, more preferably 0.01 to 0.3 part by weight and further preferably 0.02 to 0.2 part by weight. An organophosphorous stabilizer may be used alone or in combination of two or more kinds.

An UV absorbing agent may be further formulated into a resin composition of the present invention to enhance light resistance thereof. Examples of such an UV absorbing agent include: benzophenone type ultraviolet absorbers such as 2,2'-dihydroxy-4-methoxybenzophenone; triazine type ultraviolet absorbers such as 2-(4,6-diphenyl-1,3,5-triazine-2-yl)-5-hexyloxyphenol; benzotriazole type ultraviolet absorbers such as 2-(2H-benzotriazole-2-yl)-4-methylphenol, 2-(2H-benzotriazole-2-yl)-4-tert-octylphenol, 2-(2H-benzotriazole-2-yl)-4,6-bis(1-methyl-1-phenylethyl)phenol, 2-(2H-benzotriazole-2-yl)-4,6-di-tert-pentylphenol, 2-(5-chloro-2H-benzotriazole-2-yl)-4-methyl-6-tert-butylphenol, 2-(5-chloro-2H-benzotriazole-2-yl)-2,4-di-tert-butylphenol and 2,2'-methylenebis[6-(2H-benzotriazole-2-yl)-4-(1,1,3,3-tetramethylbutyl)phenol].

The UV absorbing agent may be used alone or in combination of two or more kinds. The preferable amount of the UV absorbing agent, based on 100 parts by weight of a component (A), is usually 0.001 to 1 part by weight, more preferably 0.01 to 0.8 part by weight and further preferably 0.05 to 0.5 part by weight.

A fluorescent whitening agent may be further formulated into a resin composition of the present invention. The fluorescent whitening agent absorbs UV light energy and radiates this energy to the visible light region. The formulation of a fluorescent whitening agent can thus improve color tone of a resin composition to white or bluish white.

Examples of the fluorescent whitening agent include: stilbene type compounds, benzimidazol type compounds, benzoxazole type compounds, naphthalimide type compounds, rhodamine type compounds, coumarin type compounds and oxazine type compounds. The preferable amount of the fluorescent whitening agent, based on 100 parts by weight of a component (A), is usually 0.0005 to 0.1 part by weight, more preferably 0.001 to 0.05 part by weight and further preferably 0.003 to 0.03 part by weight.

Next, a production method of a resin composition according to the present invention is explained in detail. A resin composition of the present invention can be produced by blending each component at a ratio described in the present specification, followed by melt kneading them by using a melt kneading apparatus such as an extruder. As an apparatus for blending and melt kneading each component, one which has been conventionally used is a preliminary blending apparatus such as a tumbler and a ribbon blender. A melt kneading apparatus such as a single screw extruder or a twin screw extruder and cokneader can be used. Raw materials may be fed into a melt kneading apparatus after preliminary mixing of each component or independently by each component.

As a melt kneading apparatus to produce the resin composition of the present invention, an extruder is typically used, preferably a twin screw extruder. Melt kneading may be carried out by optimizing a cylinder set temperature of the extruder in the range of 200 to 300° C., preferably 220 to 270° C., and a screw rotation speed of the extruder in the range of 100 to 700 rpm, preferably 200 to 500 rpm. In melt kneading, attention should be paid so as not to generate excess heat. Furthermore, if necessary, making an opening port at the latter zone of an extruder is effective for open venting or vacuum venting. Residence time of a raw material resin in an extruder is usually optimized in the range of 10 to 60 seconds.

Examples of molding methods for various molded articles using a resin composition of the present invention include, but are not limited to: injection molding, extrusion molding, compression molding, rotation molding, blow molding, and the like. Among them, injection molding and extrusion molding are preferably used.

When a resin composition of the present invention is molded by injection molding, a molded article can be obtained by using not only a usual molding method but also various injection molding methods such as: injection compression molding, injection press molding, gas-assisted injection molding, foam molding (including a method of charging a supercritical fluid), insert molding, in-mold coating molding, molding using an adiabatic mold, molding using an rapid heating and cooling mold, two color molding, sandwich molding and ultra-fast injection molding. In injection molding, either a cold runner system or a hot runner system may be selected.

In injection molding, as a special method for increasing resin fluidity, a method for enhancing fluidity of a melted resin by dissolving nitrogen or carbon dioxide as a plasticizer in the melted resin may be adopted. As appropriate nitrogen or carbon dioxide may be charged from a vent portion set at a cylinder of an injection molding machine. Further, to enhance transcription of a molded article or to prevent an ugly appearance (swirl marks) when filling said melted resin, having dissolved nitrogen or carbon dioxide into a mold, nitrogen or carbon dioxide may be filled into a mold before filling a melted resin into the mold. In the case where the object is to enhance transcription, carbon dioxide is preferably used.

When a resin composition of the present invention is extrusion molded, various profile extrudates, sheets, films, and the like can also be used. For molding sheets or films, a blown film molding method, a calender method, a casting method, and the like can be used.

A resin composition of the present invention can be used in various application fields such as: electric/electronic equipment, OA equipment, a liquid crystal projector, a copying machine, a printer, notebook-type personal computer, a cellular phone, lighting fitting, a signboard, a reflecting plate for a liquid crystal back light unit (including a plastic frame), a machine tool, car parts, electric connector parts, chassis parts, a container and miscellaneous goods.

EXAMPLES AND COMPARATIVE EXAMPLES

The present invention is described in more detail below using Examples and Comparative Examples.

In Examples and Comparative Examples, the following components (A) to (E) were used to produce an aromatic polycarbonate resin composition.

A component (C*) represents a component not satisfying requirements of a component (C) of the present invention.
1. Component (A): An Aromatic Polycarbonate
(A-1)
A pellet form bisphenol A type polycarbonate produced by a melt ester exchange method from bisphenol A and diphenyl carbonate, containing 300 ppm by weight of octadecyl-3-(3,5-di-t-butyl-4-hydroxyphenyl)propionate as a hindered phenol type antioxidant and 150 ppm by weight of tris(2,4-di-t-butylphenyl)phosphite as a phosphite type heat stabilizer.

Weight average molecular weight (Mw)=22,000
Ratio of phenolic terminal groups (ratio of phenolic terminal groups to total terminal groups)=35% by mol
2. Component (B): Reinforcing Agent and/or Filler
(B-1) Talc Powder
Talc powder having average particle diameter of 5 μm, whiteness of 96%, bulk specific volume of 2.3 ml/g, specific surface area of 8.5 $m^2$/g, water content of 0.2% by weight, oil absorption amount of 51 ml/100 g and pH=9.0

Average particle diameter was measured as median diameter by means of a laser diffraction method using SALD-2000 analyzer of Shimadzu Corp.

Whiteness was measured in accordance with JIS-P8123 using "Digital Hunter ST" of Toyo Seiki Co., Ltd.

Specific surface area was measured by means of a vapor phase adsorption method, a BET method using Flowsorp 2300 of Shimadzu Corp.

Water content was measured in accordance with JIS-K5101 using STAC-5100 of Shimadzu Corp.

Oil absorption amount and bulk specific volume were measured in accordance with JIS-K5101.

PH was measured in accordance with JIS-K5101.
(B-2) Mica
"CLARITE MICA 200-D (trade mark)" mica of Kuraray Co., Ltd. was used.
3. Component (C): An Aromatic Sulfonic Acid and/or an Ester Thereof
(C-1) p-toluenesulfonic Acid
The guaranteed reagent of Wako Pure Chemical Ind. Ltd. was used.
(C-2) Methyl p-toluenesulfonate
The guaranteed reagent of Wako Pure Chemical Ind. Ltd. was used.
(C*-1) Methanesulfonic Acid
The guaranteed reagent of Wako Pure Chemical Ind. Ltd. was used. (C*-1) methanesulfonic acid is a component which does not satisfy requirements of a (C) component of the present invention.
(C*-2) Phosphoric Acid
A 85% aqueous solution (guaranteed reagent) of Wako Pure Chemical Ind. Ltd. was used. (C*-2) phosphoric acid is a component which does not satisfy requirements of a (C) component of the present invention.
(C*-3) Maleic Acid
The guaranteed reagent of Wako Pure Chemical Ind. Ltd. was used. (C*-3) maleic acid is a component which does not satisfy requirements of a (C) component of the present invention.
(C*-4) Phthalic Acid
The guaranteed reagent of Wako Pure Chemical Ind. Ltd. was used. (C*-4) phthalic acid is a component which does not satisfy requirements of a (C) component of the present invention.
(C*-5) 8-Anilino-1-naphthalene Sulfonic Acid Ammonium salt
The guaranteed reagent of MP Biomedicals, LLC was used. (C*-5) 8-Anilino-1-naphthalene sulfonic acid ammonium salt is a component which does not satisfy requirements of a (C) component of the present invention.
4. Component (D): Titanium Oxide
(D-1) "TIPAQUE PC-3 (trade mark)" of Ishihara Sangyo Co., Ltd. was used.
5. Component (E): Fluoropolymer
(E-1)
"Metablen A3800 (trade mark)" of Mitsubishi Rayon Co., Ltd. was used.
(E-2)
"Fluon AD911 (trade mark)", an aqueous dispersion of PTFE (polytetrafluoroethylene) with solid content of 60% by weight, of Asahi Glass Co., Ltd. was used.

Examples 1 to 7 and Comparative Examples 1 to 8

A polycarbonate resin composition was obtained by melt kneading each component in the amount (unit: parts by weight) shown in Table 1 using a twin screw extruder.

A twin screw extruder (ZSK-25, L/D=37, Werner & Pfleiderer GmbH) was used as the melt kneading apparatus, and the melt kneading was carried out in the following conditions: cylinder set temperature of 250° C., screw rotation speed of 250 rpm, the extrusion rate of mixed resin of 23 kg/hr, residence time of raw material resin inside extruder of 30 to 40 seconds.

In Examples 1 and 2, along with Comparative Examples 1 and 8, raw material components (A), (B) and (C) (including component (C*), if used) are charged into a twin-screw extruder using a feeder, after preliminary blending of the components in a tumbler for 20 minutes in advance. Vacuum venting was carried out at latter zone of the extruder.

In Examples 3 to 7, component (A), in pellet form, was independently and continuously charged into a twin-screw extruder using a weight feeder. Components (B) and (C) (including component (C*), if used) are charged into a twin screw extruder using a weight feeder, as a mixture, after preliminary blending the components for 5 minutes using a Henschel mixer in advance.

When components (D) and/or (E) were used, they were further blended with the above mixture of components (B) and (C), followed by charging it into a twin-screw extruder using a weight feeder.

During melt kneading, the temperature of the melted resin measured by a thermocouple at a die zone of the extruder was 260 to 270° C. The obtained pellets were dried at 120° C. for 5 hours and subjected to an injection molding using an injection molding machine (Autoshot 50D from Fanuc Ltd.) for the following tests.

(1) Measurement of Flexural Modulus

A plaque with thickness of ⅛ inch was molded using an injection molding machine (Autoshot 50D of Fanuc Ltd.) set at cylinder temperature of 280° C. and mold temperature of 80° C., and the flexural modulus was measured in accordance with ASTM D790. Measurement temperature was 23° C. (Unit: MPa)

(2) Measurement of Melt Index (MI)

Melt index value was measured in accordance with JIS-K7210 under the conditions of furnace temperature of 300° C. and load of 1.2 kg. (Unit: g/10 minutes)

(3) Measurement of Melt Index (MI) After Residence in a Molding Machine.

After residence of a resin composition in a cylinder of the injection molding machine for 20 minutes a strip specimen with thickness of ⅛ inch was molded using an injection molding machine (Autoshot 50D of Fanuc Ltd.) set at cylinder set temperature of 300° C. The melt index value was measured on a sample cut out of the strip specimen obtained, in accordance with JIS-K7210 under the conditions of furnace temperature of 300° C. and load of 1.2 kg. (Unit: g/10 minutes)

(4) Thermal-hydrolysis Resistance

A test piece for a tensile test was molded using an injection molding machine (Autoshot 50D of Fanuc Ltd.) set at cylinder temperature of 280° C. and mold temperature of 80° C. The test piece was exposed to an environment of 80° C. and relative humidity of 95%, and the tensile break strength was measured in accordance with ASTM-D638. The time required for the tensile break strength to decrease to ½ of the initial value (before exposure) was measured. (Unit: hour)

(5) Appearance Evaluation of a Molded Article

A plate with size of 150 mm×150 mm×2 mm was molded using an injection molding machine (Autoshot 50D of Fanuc Ltd.), set at cylinder temperature of 320° C. and mold temperature of 80° C., by filling into a mold cavity from one point gate with diameter of 1.6 mm at one end of the plate. Surface appearance thereof was evaluated by visual observation and classified by the following criteria:

◯: good appearance

X: silver generation was observed (6) Content of Agglomeration of Component (B) and/or Component (C)

A plate with size of 50 mm (W)×90 mm (L)×2.5 mm (T) was molded using an injection molding machine (Autoshot 50D of Fanuc Ltd.) set at cylinder temperature of 290° C. and mold temperature of 80° C. The content of agglomeration of component (B) and/or component (C) on the front and back surfaces of 4 plates was counted by the following standards.

In measurement of the content of said agglomeration for a translucent plate, the content inside the plate was also counted. But, consideration was taken to avoid duplication of counts in the front side and the back side.

Said agglomeration diameter of 0.1 mm or less: 0 point

Said agglomeration diameter of 0.11 mm or more, and 0.2 mm or less: 1 point

Said agglomeration diameter of 0.21 mm or more, and 0.3 mm or less: 10 point

Said agglomeration diameter of 0.31 mm or more: 30 point

Codes in Table 1 represents as follows:

⊚: Content of said agglomeration of less than 20 points

◯: Content of said agglomeration of 20 points or more, and less than 100 points

Δ: Content of said agglomeration of 100 points or more (7) Flame Retardancy

A strip specimen with size of 127 mm×12.7 mm×1.5 mm (T) was molded using an injection molding machine (Autoshot 100D of Fanuc Ltd.) set at cylinder temperature of 260° C. and mold temperature of 80° C. The 20 mm Vertical Burning Test described in UL-94 standard was carried out and total second until quenching on 5 specimens was counted (two times ignitions for each specimen).

Codes in Table 1 represents as follows:

◯: total seconds until quenching of less than 100 seconds

Δ: total seconds until quenching of 100 seconds or more, and less than 250 seconds X: total seconds until quenching of 250 seconds or more A specimen with flame dripped during the test is shown as "drip" in Table 1.

Results are shown in Table 1.

(8) TGA Evaluation for a Mixture of Component (B) and Component (C)

The ratio of $\Delta W/W1$ as defined above concerning a mixture of component (B) and component (C) employed in Examples 3, 5 and 6 was 0.0002, which was determined by using TGA (TGA-7 from Parkin Elmer Inc.) under the conditions of nitrogen gas flow, programming heating rate of 40° C./min from room temperature to 500° C., and 10 mg of specimen weight.

TABLE 1

|  |  |  |  | Example 1 | Example 2 | Example 3 |
|---|---|---|---|---|---|---|
| Component (A) | A-1 | PC (Mw = 22,000) | Part by weight | 100 | 100 | 100 |
| Component (B) | B-1 | Talc | Part by weight | 8 | 10 | 5 |
|  | B-2 | Mica | Part by weight | 0 | 0 | 0 |
| Component (C) | C-1 | P-toluenesulfonic acid | Part by weight | 0.1 | 0.01 | 0.15 |

TABLE 1-continued

|  |  |  | | Example 1 | Example 2 | Example 3 |
|---|---|---|---|---|---|---|
|  | C-2 | methyl p-toluenesulfonate | Part by weight | 0 | 0 | 0 |
| Component (C*) | C*-1 | Methanesulfonic acid | Part by weight | 0 | 0 | 0 |
|  | C*-2 | Phosphoric acid | Part by weight | 0 | 0 | 0 |
|  | C*-3 | Maleic acid | Part by weight | 0 | 0 | 0 |
|  | C*-4 | Phthalic acid | Part by weight | 0 | 0 | 0 |
|  | C*-5 | 8-Anilino-1-naphthalene sulfonic acid ammonium salt | Part by weight | 0 | 0 | 0 |
| Component (D) | D-1 | Titanium oxide | Part by weight | 0 | 0 | 0 |
| Component (E) | E-1 | A3800 | Part by weight | 0 | 0 | 0.6 |
|  | E-2 | Dispersion PTFE | Part by weight | 0 | 0 | 0 |
| pH of a mixture of components (B) and (C) |  |  | MPa | 6.8 | 8.0 | 6.2 |
| Flexural modulus |  |  | MPa | 3,100 | 3,250 | 2,900 |
| MI value |  |  | g/10 min | 15 | 21 | 13 |
| MI value after residence |  |  | g/10 min | 17 | 23 | 16 |
| Time until tensile break strength reduces to ½ (80° C., 95% RH) |  |  | Hr | >1,000 | >1,000 | >1,000 |
| Appearance of molded article |  |  |  | — | ○ | ○ | ○ |
| Content of agglomeration of component (B) and/or component (C) |  |  |  | — | — | — | ○ |
| Flame retardancy |  |  |  | — | — | — | ○ |

|  |  |  |  | Example 4 | Example 5 | Example 6 | Example 7 |
|---|---|---|---|---|---|---|---|
| Component (A) | A-1 | PC (Mw = 22,000) | Part by weight | 100 | 100 | 100 | 100 |
| Component (B) | B-1 | Talc | Part by weight | 0 | 5 | 10 | 0 |
|  | B-2 | Mica | Part by weight | 5 | 0 | 0 | 5 |
| Component (C) | C-1 | P-toluenesulfonic acid | Part by weight | 0.02 | 0.15 | 0.3 | 0 |
|  | C-2 | methyl p-toluenesulfonate | Part by weight | 0 | 0 | 0 | 0.02 |
| Component (C*) | C*-1 | Methanesulfonic acid | Part by weight | 0 | 0 | 0 | 0 |
|  | C*-2 | Phosphoric acid | Part by weight | 0 | 0 | 0 | 0 |
|  | C*-3 | Maleic acid | Part by weight | 0 | 0 | 0 | 0 |
|  | C*-4 | Phthalic acid | Part by weight | 0 | 0 | 0 | 0 |
|  | C*-5 | 8-Anilino-1-naphthalene sulfonic acid ammonium salt | Part by weight | 0 | 0 | 0 | 0 |
| Component (D) | D-1 | Titanium oxide | Part by weight | 0 | 0 | 10 | 0 |
| Component (E) | E-1 | A3800 | Part by weight | 0 | 0 | 0 | 0 |
|  | E-2 | Dispersion PTFE | Part by weight | 0 | 0.6 | 0 | 0 |
| pH of a mixture of components (B) and (C) |  |  | MPa | 7.2 | 6.2 | 6.2 | 7.1 |
| Flexural modulus |  |  | MPa | 3,050 | 2,900 | 3,450 | 3,100 |
| MI value |  |  | g/10 min | 17 | 14 | 16 | 18 |
| MI value after residence |  |  | g/10 min | 20 | 16 | 22 | 19 |
| Time until tensile break strength reduces to ½ (80° C., 95% RH) |  |  | Hr | — | — | — | >1,000 |
| Appearance of molded article |  |  |  | — | ○ | ○ | ○ | ○ |
| Content of agglomeration of component (B) and/or component (C) |  |  |  | — | ○ | ◎ | ◎ | ○ |
| Flame retardancy |  |  |  | — | — | ○ | — | — |

| Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|
| 100 | 100 | 100 | 100 | 100 | 100 | 100 | 100 |
| 0 | 8 | 8 | 8 | 8 | 8 | 8 | 8 |
| 0 | 0 | 0 | 0 | 0 | 0 | 0 | 0 |
| 0 | 0 | 3 | 0 | 0 | 0 | 0 | 0 |
| 0 | 0 | 0 | 0.3 | 0 | 0 | 0 | 0 |
| 0 | 0 | 0 | 0 | 0.2 | 0 | 0 | 0 |
| 0 | 0 | 0 | 0 | 0 | 0.3 | 0 | 0 |
| 0 | 0 | 0 | 0 | 0 | 0 | 0.3 | 0 |
| 0 | 0 | 0 | 0 | 0 | 0 | 0 | 0.3 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| — | 9.0 | 2.5 | 4.5 | — | — | — | — |
| 2,450 | 3,090 | 3,100 | 3,100 | 3,030 | 3,050 | 3,100 | 3,080 |
| 18 | 45 | 48 | 17 | 17 | 20 | 22 | 18 |
| 20 | — | — | 35 | 38 | — | — | 32 |
| >1,000 | 300 | 200 | — | 500 | — | — | — |
| ○ | X | X | X | X | X | X | X |
| ○ | — | — | — | — | — | — | — |
| drip | drip | — | — | — | — | — | — |

[—] in Table 1 represents "not evaluated"

Examples 1 to 5 and 7 show results of resin compositions of the present invention, indicating excellent rigidity, excellent melt stability, excellent surface appearance of the molded articles, excellent thermal-hydrolysis resistance, and Examples 3 and 5 show enhanced flame retaradancy.

Example 6 is a result using an aqueous dispersion of a fluoropolymer (i.e., PTFE) as a component (E), showing reduced content of agglomeration of component (B) and/or component (C).

Comparative Examples 1, 2 and 4 to 8 are the cases without using a component (C) or the cases using an acid or derivatives thereof not satisfying the requirements of a component (C) of the present invention, showing poor melt stability and poor appearance of the molded articles.

Comparative Example 3 is the case where the pH value of a mixture consisting of component (B) and component (C) is beyond the range restricted in the present invention, showing poor melt viscosity and poor appearance of the molded article.

INDUSTRIAL APPLICABILITY

A resin composition of the present invention has excellent rigidity, excellent melt stability and excellent appearance and can be used in various application fields such as: electric/electronic equipment, vehicles, construction, containers and miscellaneous goods. Thus, a resin composition of the present invention has very high industrial applicability.

The invention claimed is:

1. A method of producing an aromatic polycarbonate resin composition comprising a resin component (A) comprising more than 50 parts by weight of an aromatic polycarbonate; a reinforcing agent and/or a filler (B); and an aromatic sulfonic acid and/or an ester thereof (C) by using a melt kneading apparatus, wherein said composition comprises 1 to 200 parts by weight of said component (B) and 0.001 to 5 parts by weight of said component (C) based on 100 parts by weight of said component (A), said method comprising:
preparing a mixture consisting of said component (B) and said component (C) in advance, wherein said mixture of said component (B) and said component (C) has a pH of 4 to 8 when measured in accordance with JIS-K5101; and then feeding said component (A) and said mixture consisting of said component (B) and said component (C) to said melt kneading apparatus to melt knead them.

2. The method according to claim 1, wherein said component (B) is at least one member selected from a group consisting of glass fiber, glass flake, carbon fiber, talc and mica.

3. The method according to claim 1, wherein 0.1 to 30 parts by weight of titanium oxide (D) is added to the mixture of component (B) and component (C) prior to feeding to the melt kneading apparatus.

4. The method according to claim 1, wherein 0.01 to 1 part by weight of a fluoropolymer (E) is added to the mixture of component (B) and component (C) prior to feeding to the melt kneading apparatus.

5. The method according to claim 3, wherein
0.01 to 1 part by weight of a fluoropolymer (E) is added to the mixture of component (B) and component (C) prior to feeding to the melt kneading apparatus.

6. The method according to claim 4, wherein an aqueous dispersion of a fluoropolymer is used as said component (E).

7. The method according to claim 5, wherein an aqueous dispersion of a fluoropolymer is used as said component (E).

8. The method according to claim 1, wherein said composition comprises 0.005 to 3 parts by weight of said component (C) based on 100 parts by weight of said component (A).

* * * * *